(12) United States Patent
Di Cocco et al.

(10) Patent No.: US 9,344,450 B2
(45) Date of Patent: May 17, 2016

(54) DETECTING PHISHING OF A MATRIX BARCODE

(71) Applicant: GLOBALFOUNDRIES INC., Grand Cayman (KY)

(72) Inventors: Antonio Di Cocco, Rome (IT); Leonardo Lanni, Rome (IT); Nicola Milanese, Rome (IT); Riccardo Pizzutilo, Rome (IT); Andrea Tortosa, Rome (IT)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/446,020

(22) Filed: Jul. 29, 2014

(65) Prior Publication Data

US 2015/0089642 A1 Mar. 26, 2015

(30) Foreign Application Priority Data

Sep. 24, 2013 (GB) .................................. 1316902.4

(51) Int. Cl.
*H04L 29/06* (2006.01)
*G06K 7/14* (2006.01)
*G06F 21/36* (2013.01)
*G06K 7/10* (2006.01)

(52) U.S. Cl.
CPC ............ *H04L 63/1483* (2013.01); *G06F 21/36* (2013.01); *G06K 7/1095* (2013.01); *G06K 7/1417* (2013.01); *G06F 2221/031* (2013.01)

(58) Field of Classification Search
CPC ............. H04L 63/1483; G06K 7/1095; G06K 7/1417; G06F 21/36
See application file for complete search history.

(56) References Cited

U.S. PATENT DOCUMENTS

| 7,273,175 | B2 | 9/2007 | Zhao et al. |
| 2005/0001033 | A1* | 1/2005 | Cheong et al. ................. 235/454 |
| 2005/0194445 | A1* | 9/2005 | Takakura et al. ........... 235/462.1 |
| 2007/0081694 | A1* | 4/2007 | Ryan, Jr. .................. G07D 7/20 382/100 |
| 2008/0110990 | A1* | 5/2008 | Cordery ............... G07D 7/0026 235/462.1 |
| 2009/0041330 | A1 | 2/2009 | Journey et al. |
| 2009/0060259 | A1* | 3/2009 | Goncalves .............. A47F 9/047 382/100 |
| 2009/0242649 | A1* | 10/2009 | Mizukoshi et al. ........... 235/494 |
| 2010/0246902 | A1* | 9/2010 | Rowe ................. G06K 9/00033 382/115 |
| 2011/0289434 | A1 | 11/2011 | Kieft |
| 2011/0290882 | A1 | 12/2011 | Gu et al. |
| 2012/0024956 | A1 | 2/2012 | Chen |

(Continued)

FOREIGN PATENT DOCUMENTS

KR 101115250 B1 2/2012

OTHER PUBLICATIONS

"Methods to Check Validity of QR Codes," IP.com Prior Art Database Technical Disclosure No. IPCOM000218023D, May 15, 2012, 3 pages.

(Continued)

*Primary Examiner* — Robert Leung
(74) *Attorney, Agent, or Firm* — Thompson Hine LLP

(57) ABSTRACT

A method and a system for detecting phishing of a matrix barcode is provided. The matrix barcode comprises colored and white squares in rows and columns. The method comprises scanning the matrix barcode row by row and column by column resulting in received squares, storing a corresponding white color level for each received white square, and comparing the white color levels of the received white squares couple-wise.

12 Claims, 4 Drawing Sheets

(56) References Cited

U.S. PATENT DOCUMENTS

| | | | |
|---|---|---|---|
| 2012/0060221 A1 | 3/2012 | Gerber et al. | |
| 2012/0205439 A1 | 8/2012 | Frad et al. | |
| 2012/0280043 A1* | 11/2012 | Roseman | G06K 19/06009 235/488 |
| 2014/0270512 A1* | 9/2014 | Mesh-Iliescu et al. | 382/166 |

OTHER PUBLICATIONS

Chickowski, "Threat Update: Malicious QR Codes Pose Risk to iPhone, Android Devices," Channel Insider, Jan. 26, 2012, 2 pages. Accessed Jul. 14, 2014, http://www.channelinsider.com/c/a/Security/Threat-Update-Malicious-QR-Codes-Pose-Risk-to-iPhone-Android-Devices-741543/.

Evans, "Malicious URLs identified in QR code phishing emails," julianevansblog.com, Jan. 10, 2012, 3 pages. Accessed Jul. 14, 2014, http://www.julianevansblog.com/2012/01/malicious-urls-identified-in-qr-code-phishing-emails.html.

Evans, "The QR code mobile malware and phishing threat," julianevansblog.com, Nov. 11, 2011, 3 pages. Accessed Jul. 14, 2014, http://www.julianevansblog.com/2011/11/the-qr-code-mobile-malware-and-phishing-threat.html.

Kieseberg et al., "Malicious Pixels Using QR Codes as Attack Vector," In: Trustworthy Ubiquitous Computing vol. 6: Atlantis Ambient and Pervasive Intelligence, Khalil et al. (Eds.), Atlantis Press, 2012, pp. 21-38.

Kieseberg et al., "QR Code Security," Proceedings of the 8th International Conference on Advances in Mobile Computing & Multimedia (MoMM2010), Nov. 2010, pp. 430-435.

Maestre, "QRP: An improved secure authentication method using QR codes," Master Thesis, Universitat Oberta de Catalunya, Jun. 8, 2012, 11 pages.

Teraura et al., "Preventing the Access of Fraudulent WEB Sites by Using a Special Two-Dimensional Code (Abstract Only)," Sixth International Conference on Innovative Mobile and Internet Services in Ubiquitous Computing (IMIS), Jul. 2012, 1 page.

* cited by examiner

DETECTING PHISHING OF A MATRIX BARCODE

CROSS-REFERENCE TO RELATED APPLICATIONS

This application claims the benefit of priority to United Kingdom Patent Application No. GB1316902.4, filing date Sep. 24, 2013, the contents of which are hereby incorporated by reference.

FIELD OF THE INVENTION

The invention relates generally to a method for detecting phishing of a matrix barcode. The invention relates further to a phishing detection unit, a computing system, a data processing program, and a computer program product.

BACKGROUND OF THE INVENTION

QR Codes—being sort of a two-dimensional or matrix barcode, and sometimes referred to as 'tags'—are used intensively these days because they typically can carry more information if compared to traditional barcodes. QR Codes allow, in particular, mobile users to use a smartphone camera to read and interpret a QR code. A QR code may contain text and/or a URL (universal resource locator for, e.g., the Internet).

QR Codes are quickly diffusing and turning up everywhere: on advertising boards, TV, Web sites one can visit, post or travel signs, clothes, tickets, coupons, number plates and so on.

Being said that it may be possible that a person could stick a malicious QR code label over an existing QR code label.

QR Codes labels represent a very simple machine readable coding technique, unfortunately, also allowing to effectively performing phishing on QR codes, so that a user is hi-jacked to a phishing Web site if the information codes on the QR Code represent an Internet address, i.e., a URL. Web sites may opportunely be mirrored, by the malicious person, exactly to look similar or identical to the expected original Web site. As a next malicious step, a user may be asked to register or log-in to the fake Web site so that an attacker may steal secret data of a person.

The cost of implementing this fraud technique is ridiculously low for a person of bad faith. In fact, it only takes to: identify a physical QR Code label pointing to a certain "clean" Web site, and generate a mirrored phishing Web site of the "clean" one, with the purpose of stealing personal data of users. Additionally, a phishing URL needs to be codified pointing to the phishing, mirrored Web site into a QR Code. Also, this is pretty cheap because QR Code encoders are freely available in the Internet. A sticky version of the malicious QR Code label needs to be printed and the malicious QR Code label needs to be pasted over the original QR code label. A person with bad faith would do that unobserved.

As it can be seen, it is very simple to practice phishing via QR Codes.

Currently, there is no remediation to this serious exploit of QR Codes. What can be found on the Internet are only sites talking about this security problem with QR Codes, warning users always to check the URL of the QR Code mobile phone applications passing to a browser once the QR Code has been captured by a camera of the mobile phone.

A related problem is addressed by the document U.S. Pat. No. 7,273,175 B2 addressing hidden QR Codes in a QR Code tag using a slightly different chrominance for different squares of the QR code, thus hiding a QR Code in a given QR Code label.

Hence, there is a need to identify QR Code labels pasted over another one and replacing the original QR Code labels.

SUMMARY OF THE INVENTION

This need may be addressed by a method for detecting phishing of a matrix barcode, a phishing detection unit, a computing system, a data processing program, and a computer program product, according to the independent claims.

According to one aspect, a method for detecting phishing of a matrix barcode may be provided. The matrix barcode may comprise colored, e.g., black, and white squares in rows and columns. The method may comprise scanning the matrix barcode row by row and column by column resulting in received squares, and storing a corresponding white color level for each received white square, as well as comparing the white color levels of the received white squares couple-wise.

According to another aspect, a phishing detection unit may be provided. Also here, a matrix barcode may comprise colored and white squares in rows and columns. The phishing detection unit may comprise a scanning unit adapted for scanning the matrix barcode row by row and column by column resulting in received squares, a storage unit adapted for storing a corresponding white color level for each received white square, and a comparison unit adapted for comparing the white color levels of the received squares couple-wise.

DETAILED DESCRIPTION

It may be noted that white color levels may be stored in its color components, e.g., RGB (red, green, blue) color code components.

It may also be noted that the matrix barcode may be a two-dimensional code, e.g., a QR Code, typically used in form of a QR Code tag or label.

Instead of black and white squares of the QR Code, other color combinations also may be used. However, for clarity reasons, in this document black and white squares for the matrix barcode may mainly be used for explaining the concept of the invention. A skilled person may transform the idea to other color field combinations.

In the context of this description, the following conventions, terms and/or expressions may be used:

The term "matrix barcode" denotes a barcode like a two-dimensional two-color based code on a surface. An example of a matrix barcode may be a QR Code. This is an abbreviation for Quick Response Code and is a special form of a matrix barcode implemented as optically machine-readable label. The term QR code and QR code label or tag may be used alternatively throughout this document. Several forms and standards a of a QR code are known. Typically, they may have 21×21 up to 177×177 black and white fields or squares. Other forms, e.g., Micro-QR-Codes use a smaller number of fields, e.g. 11×11 up to 17×17. Other field number may be possible. The here proposed method may also work for other QR-code standards, like, e.g., the Secure-QR-Code. Also, future forms of QR-Codes may be handled by the proposed methods and apparatus.

The term "white color level" denotes color components of a colored area. As color codes, typical codes may be used. Here, the described examples use the RGB components (red, green, blue), representing the additive primary colors. Alternatively, the CMYK color model (cyan, magenta, yellow, key=black) or other color codes may be used.

The term "couple-wise" denotes that two elements are used for a comparison. The selection of the two elements may be performed using different algorithms, as explained later.

A "phishing notifier" denotes a signal identifying an exceeded threshold indicating a phishing circumstance.

The proposed method for detecting phishing of a matrix barcode offers a couple of advantages:

The proposed method and a related system allow an easy, cheap and fast way to identify maliciously used QR Code labels. Users may be warned, access to Web sites may be blocked and an information service collecting addresses of codified malicious QR code may be operated.

The method may be executed on every smart or mobile phone, or mobile computer, with a camera. Shading effects may be eliminated automatically so that they do not have an influence of the detection of phishing QR Code labels.

According to one embodiment of the method, increasing a counter, in particular by 1, may be comprised in the method if the white color level comparison of two received white squares of a couple may differentiate by more than a predefined threshold. Several methods for building a couple may be applied, as explained later. There may also be different algorithms to compare white color levels of white squares.

According to an enhanced embodiment of the method, the matrix barcode may be a QR Code. This may be the most predominant matrix barcode currently used. However, the method may be applicable to other two-dimensional matrix codes.

According to a further embodiment of the method, the storing a corresponding white color level for each received white square may also comprise marking the received square as white. Other received squares may be identified as black. All the data may be stored. This way, all white and black squares may be identifiable for further reference and processing. This way, a binary code may be identifiable; black squares may represent "1" and a white square may represent a "0", or the other way around.

One additional embodiment of the method may comprise, after the scanning of the matrix barcode, compensating shading on the matrix barcode by applying a dynamic multiplier to the color levels, in particular its RGB components, of each received square, wherein the dynamic multiplier has its value changed proportional to an intensity of shade on the matrix barcode. Typically, shades increase or decrease gradually. Due to the relative small size of typical QR code labels, a linear function may be sufficient to describe a growing darkness over a QR Code label. However, other mathematical functions may also be applied to compensate shading.

According to a further embodiment of the method, the compensation of shading may be performed if a brightness variation of received squares is expressible as a mathematical monotone function in one of the directions of the matrix barcode comprising a vertical direction, a horizontal direction, or a diagonal direction, wherein the diagonal direction may comprise a direction from a top left corner to a bottom right corner of the matrix barcode or, from a top right corner to a bottom left corner of the matrix barcode. This way, a linear function may be used to change the value of the dynamic multiplier.

According to a further enhanced embodiment, the method may also comprise activating a phishing notifier after all color level comparisons of two white squares have been performed if the counter is greater than a predefined phishing counter. This may mean that a number of potentially white squares may not be as white as they should be, indicating that a black square may be underneath the visible QR Code square of the top QR Code label. If the counter number may become too high—meaning greater than a threshold—a phishing attack may be detected. In this case, an alarm in the form of a phishing notifier may be generated. It may be a flag or signal for activating different actions.

One action may be to block a Web access, in particular on the Internet, which corresponds to the matrix barcode. The user may also be warned visibly or acoustically. The URL of the malicious QR may not be displayed or further used for any action. It may be deleted directly. Beside other re-actions, an acoustic warning for the user may be generated.

The blocked Web address, in particular its URL, may also be displayed on a display of, e.g., a smart phone. A notification may be sent to other related linked systems or programs to not let the Internet address access cause any security problems.

Furthermore, in one embodiment of the method, the blocked Web address may be sent to a phishing identification service, so as to collect incidences of malicious QR Code labels. Geo-positions of the malicious QR Code available via a GPS (global positioning system) operated together with the QR Code scanner camera of, e.g., a smart phone, may also be sent to an identification service. This way, a geographical representation of a distribution of corresponding QR Code labels may be achieved. Other users may be warned upfront. Additionally, the provider for the Web site which may have been mirrored in bad faith (see above) may be informed about the potential security problem.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device, like a mobile phone, a smart phone, or a mobile scanner with integrated communication facilities.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

BRIEF DESCRIPTION OF THE DRAWINGS

Preferred embodiments of the invention will now be described, by way of example only, and with reference to the following drawings.

DETAILED DESCRIPTION OF EXEMPLARY EMBODIMENTS

In the following, a detailed description of the figures will be given. All instructions in the figures are schematic. Firstly, a block diagram of an embodiment of the inventive method for detecting phishing of a matrix barcode is given. Afterwards, further embodiments of the phishing detection method and related unit will be described.

Figure 1:
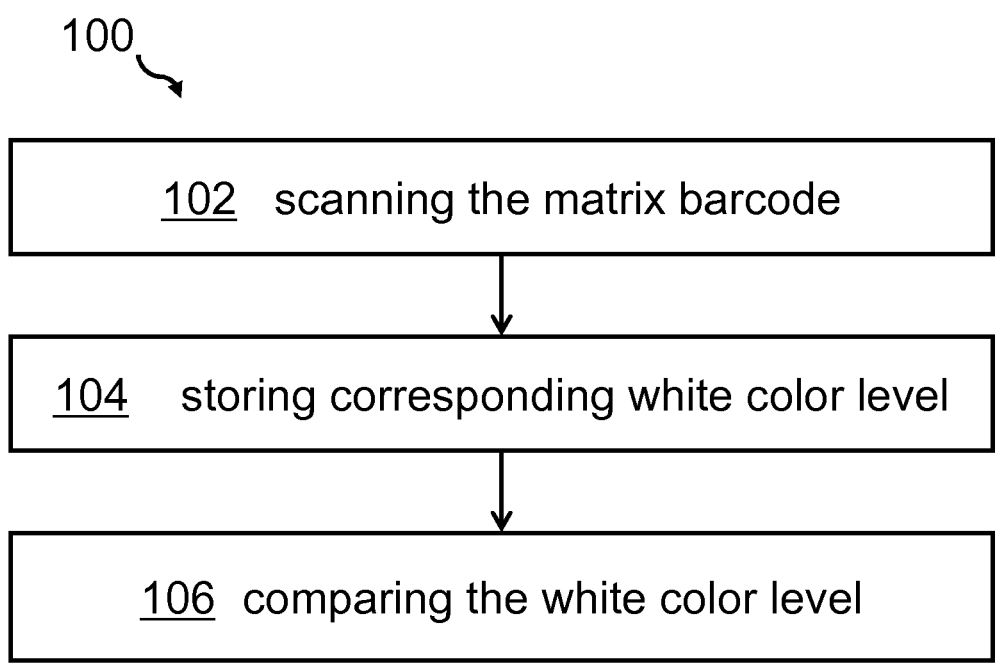
FIG. 1 shows a block diagram of the inventive method for detecting phishing of a matrix barcode.

FIG. 1 shows a block diagram of the inventive method 100 for detecting phishing of a matrix barcode. The matrix barcode may comprise black and white squares. However, also other color combinations may be possible. White squares may be combined with squares of another color, e.g., blue. An important aspect may be a good contrast between dark and light colored squares. In this sense, the white squares also may have another light color, e.g., yellow, grey, or light shades of other colors. The method proposed here may be applicable to any color matrix barcode. However, for clarity reasons, the examples may be described with white for light colors and black for dark colors of a matrix barcode label. The squares may be organized in rows and columns. The matrix code may have an overall square form or a rectangular form. Other forms are possible. A QR Code may be a typical example of a matrix barcode.

As a first step, the orientation of the matrix code label may be determined. This may be performed in a way known by a skilled person. It may not be described here in detail.

Then, the method may comprise scanning, 102, the matrix barcode row by row and column by column resulting in received squares. The received squares may be stored as data elements in a memory unit of a computer for further reference and interpretation. The scanning may be performed using an image taken by a camera of a handheld device, e.g., a camera, a camera of, e.g., a mobile phone, or the like.

Additionally, the method may comprise storing, 104, a corresponding white color level. This may be performed using the RGB (red, green, blue) color code or using other equivalent color codes for each received white square. If an 8-bit color resolution of a camera is available the corresponding white color levels may differentiate between 256 levels. Thereby, 255, 255, 255 for the three color components may represent an ideal white. However, this may only be achieved in exceptional cases. In real-life situations, the values of the RGB components may be slightly lower than the maximum level of 255 for an 8-bit color resolution.

As a next step, a comparison of the received white color levels of the received white squares may be performed couple-wise. There may be different algorithms to form couples of white squares.

If the white squares may be numbered from 1 to n, n representing the total number of detected white squares in a given QR Code label, the squares with the numbers 1 and 2, 3 and 4, 5 and 6, and so on may be compared to each other, i.e., its white color levels may be compared.

Alternatively, the following pairs of received white squares i.e., its white color levels, may be compared: ½, ⅔, ¾, and so on.

In again another alternative, a comparison may be made only row-wise or only column—wise. This may eliminate different illuminating conditions.

Also, a block-wise comparison is possible.

Furthermore, a mean value for all white squares and its RGB components may first be built and the individual RGB components of the individual white squares may be compared to the corresponding mean values of the color components.

Whichever comparison algorithm may be applied, there may be differences between the RGB components between each two selected white squares. If such a difference may exceed a predefined threshold, a counter may be increased by, e.g., 1. The increase may also be dependable on the difference.

The algorithm to calculate the difference may also vary. The difference may, e.g., relate to the sum of all three RGB components or relate to the biggest difference of only one of the color components. The threshold may be adjustable depending on the chosen algorithm.

Detected received white squares with white color code level differences exceeding the threshold may indicate that the particular received white square may have another black square of another QR Code label below it on a different QR Code label below it (i.e., the original one which has be "oversticked") from an original matrix code label, as explained below.

Figure 2:
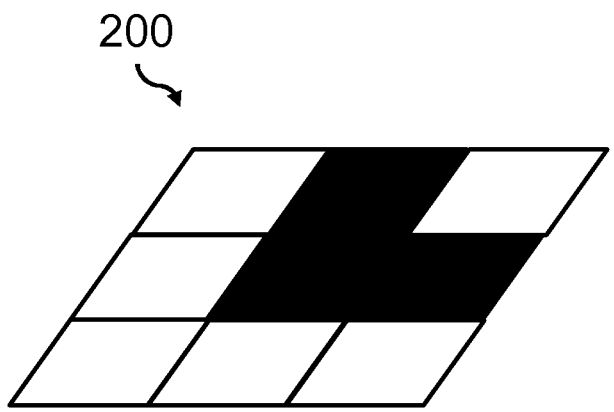
FIG. 2 shows a QR Code label.

FIG. 2 shows a portion of QR Code label portion 200. As known, the typical QR code comprises a plurality of black and white squares in a field. Here, only a 3×3 matrix is shown to illustrate the inventive concept. However, a skilled person would be able to make the transformation to any matrix size. The QR Code portion 200 shows three black squares and six white squares. Here, the QR Code label portion 200 may also represent a complete QR Code label.

Figure 3:
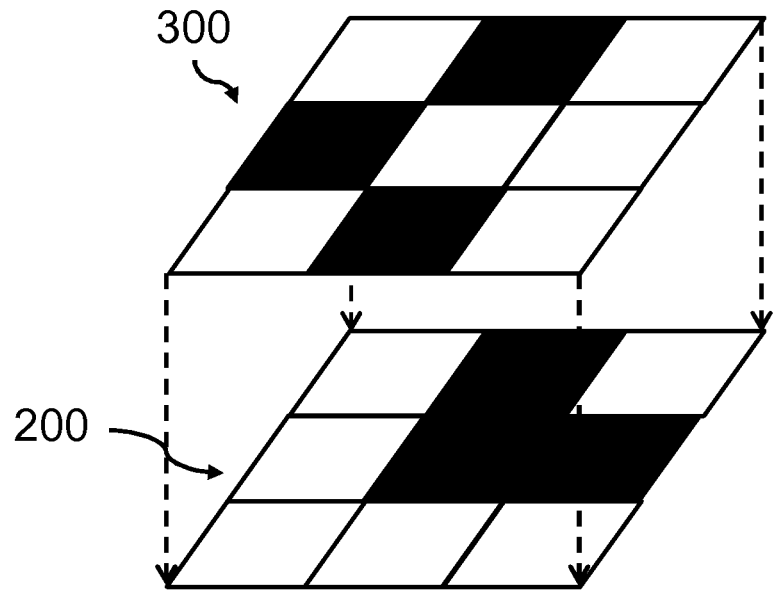
FIG. 3 shows a second, malicious QR Code label and how it may be pasted over the original QR Code label.

In case of QR Code phishing, a person in bad faith would paste another QR Code label or tag 300 over the original QR Code label 200. This is shown in FIG. 3. As can be easily seen, some of the squares show a different color when compared to the original QR code label 200.

Figure 4:
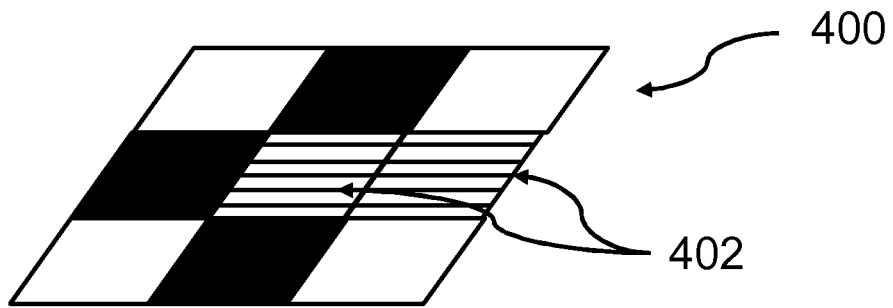
FIG. 4 shows an effect of a pasted QR Code label over another.

FIG. 4 shows an effect of a pasted QR code label 300 over another. Because those QR Code labels 300 that may be placed over an original QR code label 200 have to be comparably thin in order not to be detected physically too easy. However, this may have the consequence that the recognized QR code label 400 may be partially transparent. In other words, it may be possible to detect, even obfuscated, what was behind the pasted QR code 300. This is due to the fact that QR codes typically comprise only two colors, namely black and white. Therefore, the following four configurations are possible:

1) original QR Code (200) square unit was white, sticky phishing QR Code (300) square unit is white;
2) original QR Code (200) square unit was black, sticky phishing QR Code (300) square unit is black;

3) original QR Code (200) square unit was white, sticky phishing QR code (300) square unit is black;
4) original QR Code (200) square unit was black, sticky phishing QR code (300) square unit is white.

Being that white is more transparent than black, configuration 4 may bring to the fact that when it happens, the resulting white square unit of the pasted QR Code label 300 may be slightly darker if compared with a square unit coming from configuration 1). In other words, the resulting color of white-over-black is darker than the resulting color of white-over-white. This may be detectable by a scanner or camera together with the phishing detection unit. Those situations in which a QR Code label 200 has a black square and pasted QR Code label 300 has at the same place a white square are identifiable by the reference sign 402. They may appear slightly "more grey" (illustrated as striped squares) than clear white squares.

In some implementations, a general level of white may be established before data about received white squares may further be processed. This may represent a kind of normalization. If the camera captures the QR code in a not well illuminated room, the point of white would not be 255 255 255 in the RGB system but something like 250 250 250 which may represent a certain shade of grey. Black squares would ideally be represented as 0 0 0 in the RGB system. However, in a not well illuminated room or due to optical reflection, the QR Code black squares may appear as 20 20 20 in the RGB system.

Based on this, normalization may be performed using various algorithms. For example, all RGB color levels of all white squares of the received QR Code may be averaged representing a typical average white color for the QR code. This may represent the general level of white for a specific captured QR code.

Additionally, the received white color levels may be multiplied by a dynamic multiplier to counter shading over the surface of the QR Code label. Often, in not well illuminated environments, the whole QR code label may not be darkened, but only a portion of it. A shadow may be defined as a gradient of darkness/brightness that may vary uniformly in one direction. An algorithm may be able to dynamically apply a different white/black coefficient, i.e., dynamic multiplier, for darkened regions of the captured QR Code label. A region may be defined as shaded if the brightness variation along a described direction may be described as a mathematically monotone function, e.g., brightness always increases or always decreases in that given direction. If not, the dynamic multiplier may be not applied, only a general threshold may be applied.

However, in this case of a shade, due to the relative small size of a QR Code label, it may be sufficient to calculate shading—in case of a shade—only in a vertical, a horizontal or the two diagonal (from left top to bottom right or from top right to bottom left) directions.

So, a decision for white and black true colors may be summarized in these steps:
1) Shading detection: a multiplier is applied for each square block proportionally to the intensity of shade if any.
2) Threshold calculation: The threshold calculation may be performed depending on the general level of white starting from the QR Code label modified by using the dynamic multiplier.
3) Scanning of the QR Code label row by row and column by column.

Figure 5:
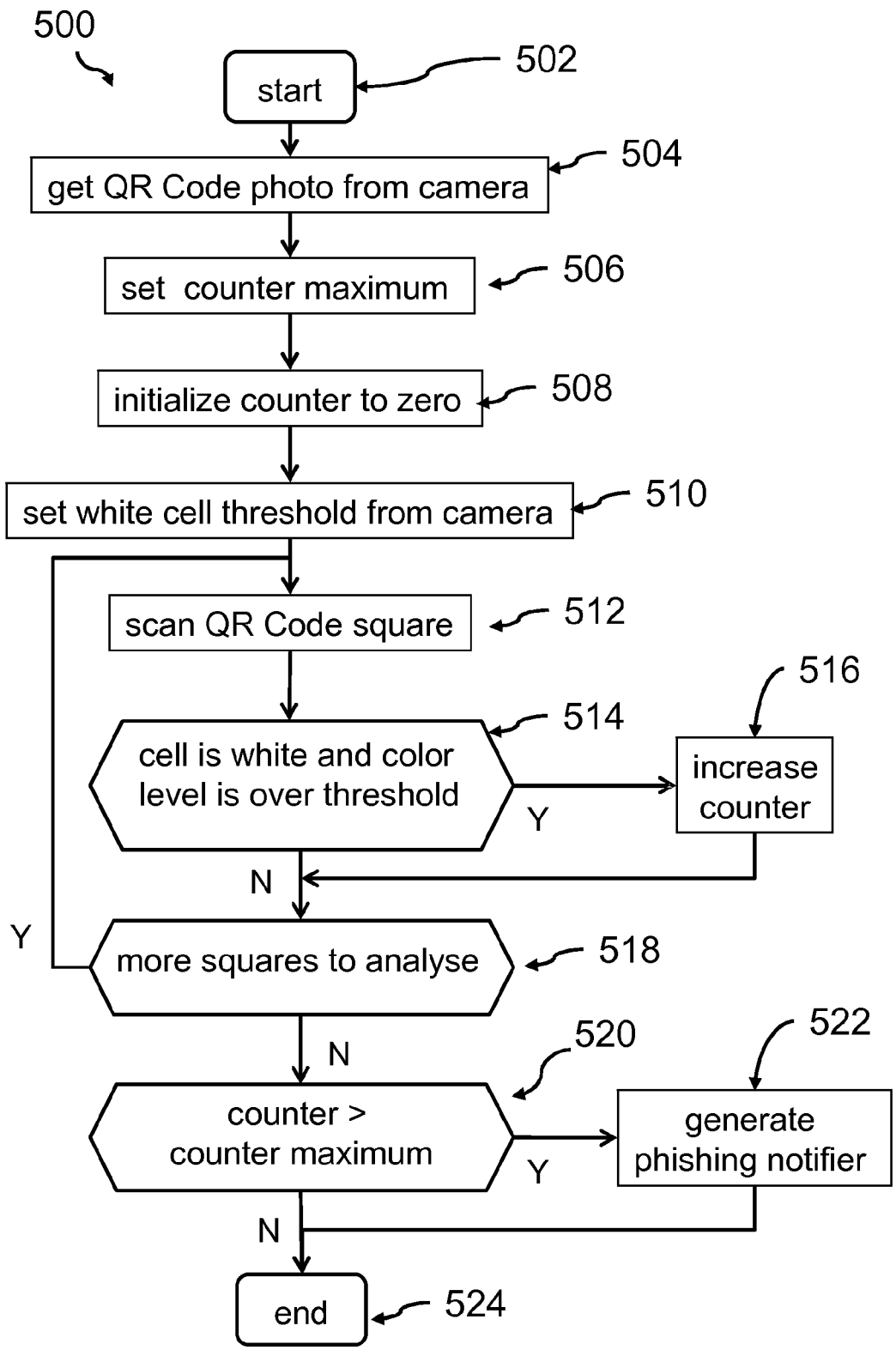
FIG. 5 shows a block diagram of an algorithm related to the inventive method.

Consequently, if a dynamic multiplier may be used to eliminate effects of shades over the QR Code label, such algorithm steps may be implemented before the scanning of the QR code may be performed, thus, before block 512 in FIG. 5, or before step 102 of the method, as described in FIG. 1, may be performed.

An example may illustrate the process even better: the darkest received square may be represented by the values 100 100 100 in the RGB system and not by the ideal of values of black 0 0 0. The lightest square may have the values 200 200 200 in the RGB system, and not the ideal values 255 255 255 in the RGB system. The dynamic multiplier may be set to 2 2 2 for the RGB components. In another example, instead of 100 100 100, the received RGB components may be 120 120 120. In this case, the dynamic multiplier may be set to 0.5 0.5 0.5. Thus, the dynamic multiplier may be a user setting value based on experience.

After the digital representation of the QR Code squares may have been normalized, the same threshold value for comparisons of white color levels may be applicable.

This method to calculate shading is particularly cheap in terms of calculation and is perfectly applicable for small black and white and block-made images as QR code. Generally, for photos, the shading detection may be performed through more expensive transformations to enhance edges and balance image brightness, but it's too expensive.

FIG. 5 shows a block diagram 500 of an algorithm or program related to the inventive method. The algorithm may start at 502. At 504, a QR code photo may be obtained from a camera. The counter may be set to the maximum, 506. Additionally, the counter may be initialized to zero, 508. Furthermore, a white cell threshold for received white squares from the camera may be set, 510. Then, the photo of the QR code may be scanned, typically row by row and column by column, 512. For each received white square, it may be decided whether the corresponding white color level may exceed the white cell threshold, 514. In case of "YES", the counter may be increased by one, 516. In case of "NO", it may be decided whether more squares cells have to be analyzed, 518. In case of "YES", the process goes back to the block 512. In case of "NO", it may be checked whether the counter exceeds the counter maximum, 520. In case of "YES", a phishing notifier may be generated, 522. The algorithm may end at 524. A skilled person may be qualified to implement such an algorithm programming language, e.g., Java.

Figure 6:
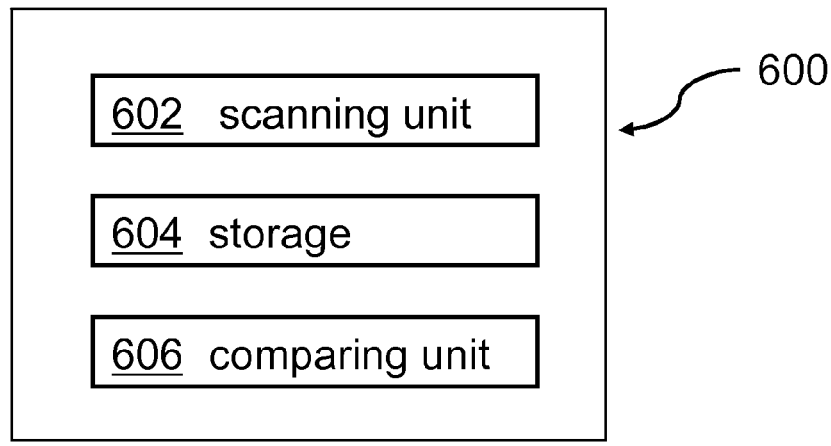
FIG. 6 shows an embodiment of a phishing detection unit.

FIG. 6 shows an embodiment of a phishing detection unit 600. As mentioned above, a matrix barcode 200 may comprise colored and white squares in rows and columns. The phishing detection unit 600 may comprise a scanning unit 602, e.g., a digital camera, a QR Code scanner, a camera of a mobile phone, or the like, and may be adapted for scanning the matrix barcode row by row and column by column. This may result in received squares storable in a storage unit 604 adapted for storing a corresponding white color level for each received white square.

A comparison unit 606 may be adapted for comparing white color levels of the received squares couple-wise as explained in context of the related method.

Figure 7:
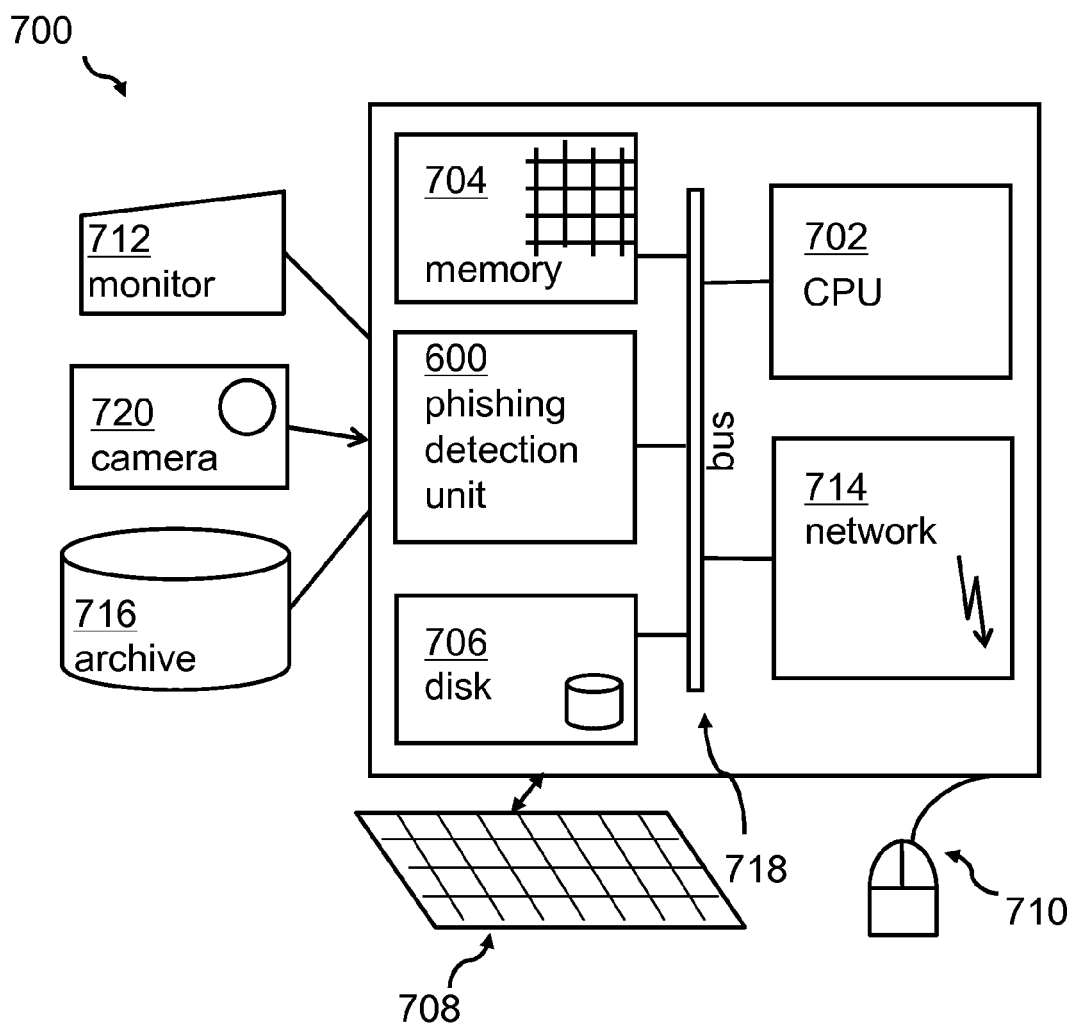
FIG. 7 shows a computer comprising the phishing detection unit.

Embodiments of the invention may be implemented together with virtually any type of computer, regardless of the platform being suitable for storing and/or executing program code. For example, as shown in FIG. 7, a computing system 700 may include one or more processor(s) 702 with one or more cores per processor, associated memory elements 704, an internal storage device 706 (e.g., a hard disk, an optical drive such as a compact disk drive or digital video disk (DVD) drive, a flash memory stick, a solid-state disk, etc.), and numerous other elements and functionalities, typical of today's computers (not shown). The memory elements 704 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 716 for an execution. Elements inside the computer 700 may be linked together by means of a bus system 718 with corresponding adapters. Additionally, a phishing detection unit 500 may be attached to the bus system 718. It may be noted that the computer system 700 may also be a mobile phone. A camera 720 of the mobile phone may be shared with the scanning unit 502 of the phishing detection unit—equivalently, storage 704 and memory 704.

The computing system 700 may also include input means, such as a keyboard 708, a pointing device such as a mouse 710, or a microphone (not shown). Alternatively, the computing system may be equipped with a touch sensitive screen as main input device. Furthermore, the computer system 700, may include output means, such as a monitor or screen 712 [e.g., a liquid crystal display (LCD), a plasma display, a light emitting diode display (LED), or cathode ray tube (CRT) monitor]. The computer system 700 may be connected to a network (e.g., a local area network (LAN), a wide area network (WAN), such as the Internet or any other similar type of network, including wireless networks via a network interface connection 714. This may allow a coupling to other computer systems or a storage network or a tape drive. Those, skilled in the art will appreciate that many different types of computer systems exist, and the aforementioned input and output means may take other forms. Generally speaking, the computer system 700 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A method for detecting phishing of a matrix barcode comprising colored and white squares in rows and columns, the method comprising:
    scanning the matrix barcode row by row and column by column resulting in received squares;
    after the scanning the matrix barcode, compensating shading on the matrix barcode by applying a dynamic multiplier to color levels of each received square, wherein the dynamic multiplier is proportional to an intensity of shade on the matrix barcode;
    storing a corresponding white color level for each received white square; and
    comparing the white color levels of the received white squares couple-wise to determine differences therebetween that are used to detect the phishing of the matrix barcode.

2. The method according to claim 1, further comprising:
    increasing a counter if the white color levels comparison of two received white squares of a couple differentiates by more than a predefined threshold.

3. The method according to claim 1, wherein the matrix barcode is a QR Code.

4. The method according to claim 1, wherein storing the corresponding white color level for each received white square comprises:
    marking the received white square as white.

5. A method for detecting phishing of a matrix barcode comprising colored and white squares in rows and columns, the method comprising:
    scanning the matrix barcode row by row and column by column resulting in received squares;
    compensating shading on the matrix barcode by applying a dynamic multiplier to color levels of each received square, wherein the dynamic multiplier is proportional to an intensity of shade on the matrix barcode;
    storing a corresponding white color level for each received white square; and
    comparing the white color levels of the received white squares couple-wise,
    wherein the compensation of shading is performed if a brightness variation of received squares is expressible as a monotone function in one of the directions of the matrix barcode comprising a vertical direction, a horizontal direction, or a diagonal direction, wherein the diagonal direction comprises a direction from a top left corner to a bottom right corner of the matrix barcode, or from a top right corner to a bottom left corner of the matrix barcode.

6. A method for detecting phishing of a matrix barcode comprising colored and white squares in rows and columns, the method comprising:
    scanning the matrix barcode row by row and column by column resulting in received squares;
    storing a corresponding white color level for each received white square;
    comparing the white color levels of the received white squares couple-wise;
    increasing a counter if the white color levels comparison of two received white squares of a couple differentiates by more than a predefined threshold; and
    after all color level comparison of two white squares have been performed, activating a phishing notifier if the counter is greater than a predefined phishing counter.

7. The method according to claim 6, wherein a Web access that corresponds to the matrix barcode is blocked if the phishing notifier is activated.

8. The method according to claim 7, wherein the blocked Web address is displayed.

9. The method according to claim 6, wherein the blocked Web address is sent to a phishing identification service.

10. A phishing detection unit for detecting phishing of a matrix barcode comprising colored and white squares in rows and columns, the phishing detection unit comprising:
    a scanning unit configured to scan the matrix barcode row by row and column by column resulting in received squares;
    a storage unit configured to store a corresponding white color level for each received white square; and a comparison unit configured to, after scanning the matrix barcode, compensate shading on the matrix barcode by applying a dynamic multiplier to color levels of each received square, wherein the dynamic multiplier is proportional to an intensity of shade on the matrix barcode, and to compare white color levels of the received squares couplewise to determine differences therebetween that are used to detect the phishing of the matrix barcode.

11. A computer system comprising a processor, a memory and a phishing detection unit configured to detect phishing of a matrix barcode, wherein the phishing detection unit comprises:
- a camera configured to scan the matrix barcode row by row and column by column resulting in received squares;
- a storage unit configured to store a corresponding white color level for each received white square; and
- a comparison unit configured to, after scanning the matrix barcode, compensate shading on the matrix barcode by applying a dynamic multiplier to color levels of each received square, wherein the dynamic multiplier is proportional to an intensity of shade on the matrix barcode, and to compare white color levels of the received squares couplewise to determine differences therebetween that are used to detect the phishing of the matrix barcode.

12. A computer program product comprising a non-transitory computer usable medium having stored thereon a computer readable program that is configured to cause a computer to perform a method for detecting phishing of a matrix barcode, when the computer readable program is run on the computer, comprising steps of:
- scanning the matrix barcode row by row and column by column resulting in received squares;
- after the scanning the matrix barcode, compensating shading on the matrix barcode by applying a dynamic multiplier to color levels of each received square, wherein the dynamic multiplier is proportional to an intensity of shade on the matrix barcode;
- storing a corresponding white color level for each received white square; and
- comparing the white color levels of the received white squares couple-wise to determine differences therebetween that are used to detect the phishing of the matrix barcode.

* * * * *